(12) United States Patent
Mahajan

(10) Patent No.: US 6,539,089 B1
(45) Date of Patent: Mar. 25, 2003

(54) METHOD AND APPARATUS FOR IMPLEMENTING A PLURALITY OF NUMBERING PLANS IN A TELECOMMUNICATIONS NETWORK

(75) Inventor: Om Prakash Mahajan, Ocean, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/337,063

(22) Filed: Jun. 21, 1999

(51) Int. Cl.$^7$ ................................................ H04M 7/00
(52) U.S. Cl. ............. 379/221.01; 379/243; 379/220.01
(58) Field of Search ........................... 379/243, 207.02, 379/220.01, 221.01, 221.14, 201.01, 246

(56) References Cited

U.S. PATENT DOCUMENTS

| | | | |
|---|---|---|---|
| 4,754,479 A | | 6/1988 | Bicknell et al. |
| 5,226,075 A | * | 7/1993 | Funk et al. ................. 379/243 |
| 5,327,484 A | * | 7/1994 | Connell et al. .......... 379/93.01 |
| 5,333,185 A | * | 7/1994 | Burke et al. ............. 379/112 X |
| 5,506,894 A | * | 4/1996 | Billings et al. .......... 379/112 X |
| 5,553,130 A | | 9/1996 | Turner |
| 5,621,727 A | | 4/1997 | Vaudreuil |

* cited by examiner

Primary Examiner—Creighton Smith
(74) Attorney, Agent, or Firm—Ryan, Mason & Lewis, LLP

(57) ABSTRACT

A method and apparatus are disclosed for implementing a plurality of numbering plans in a telecommunications network. A network can support a private numbering plan for identifying private lines, as well as conventional public numbering plans. An illustrative hybrid numbering plan has a generic format of NPA-PPP-EXTN. The NPA value is a geographic component, in a similar manner to the PSTN plan. The PPP value identifies private lines or trunks. The EXTN value carries either the dialed digits or the derived digits through the network to the terminating private line. The EXTN digits may be required by a destination PBX to route a call to a connected station or another PBX. A numbering plan flag differentiates each of the different numbering plans employed by a network, such as the private numbering plan and the public numbering plan, to establish a plurality of routing domains. Each node or switch uses the numbering plan flag to access the appropriate routing table and forward the call to the proper destination. The numbering plan flag can be configured to differentiate among each possible routing domain, for example, using multiple flags or multiple bits in a single flag. Calls can be completed to private lines, without assigning public telephone numbers to the private lines.

29 Claims, 5 Drawing Sheets

FIG. 3

| ABBREVIATED DIALING TRANSLATION TABLE | |
|---|---|
| DIALED NUMBER | ROUTING NUMBER |
| ⋮ | ⋮ |
| 91234 | NPA+PPP+1234 |
| ⋮ | ⋮ |

FIG. 4

| PRIVATE NUMBER PLAN TABLE |
|---|
| ROUTING NUMBER |
| ⋮ |
| NPA+PPP+1234 |
| ⋮ |

FIG. 5

| NPA | DESTINATION SWITCH IDENTIFIER |
|---|---|
| 212 | 1 |
| 718 | 1 |
| ⋮ | ⋮ |
| 540 | 2 |
| 703 | 2 |

ENTRY INTERMEDIATE NODE TRANSLATION TABLE (PRIVATE NUMBERING PLAN)

FIG. 6

| PPP | LINE IDENTIFIER |
|---|---|
| 001 | 1 |
| 002 | 2 |
| ⋮ | ⋮ |
| 998 | 998 |
| 999 | 999 |

DESTINATION NODE TRANSLATION TABLE (PRIVATE NUMBERING PLAN)

METHOD AND APPARATUS FOR IMPLEMENTING A PLURALITY OF NUMBERING PLANS IN A TELECOMMUNICATIONS NETWORK

FIELD OF THE INVENTION

The present invention relates generally to telecommunications networks having private lines, and more particularly, to methods and apparatus for routing calls to one or more private lines terminated in a network.

BACKGROUND OF THE INVENTION

Business customers often use private lines, also known as dedicated access lines, to serve the telecommunication needs of their large and typically distributed locations. FIG. 1 illustrates a conventional communications network 100, consisting of a plurality of switching nodes, such as the nodes 131–134, interconnected by a plurality of links or trunks, such as the links 141–146. In the public switched telephone network (PSTN), calls are generally routed based on a standard (public) numbering or dialing plan. For example, in the United States, a North American Numbering Plan (NANP) is used to route PSTN calls. The NANP scheme is a geographical numbering scheme with the format "NPA-NXX-XXXX," where the NPA digits indicate a geographical area; the NXX digits indicate the local exchanges within a particular area and the last four digits identify a particular line or station served by the exchange. Each switch in a long distance network contains a translation table, which translates some or all of the NPA-NXX digits to determine the next route (trunk) in the path towards the destination switch. For PSTN calls, the long distance carrier hands-off the call to a terminating local exchange carrier (LEC), who completes the call to a station in a residential or business location.

Business customers frequently employ one or more high capacity private lines, which are directly connected between the customer location and the network of a long distance carrier without going through the network of the local exchange carrier. Business customers that employ a high capacity private line would like to originate and receive calls from the long distance carrier directly over the private line. For example, a calling party 110 desires to call a called party 120, connected by means of a private line 160. Since such private lines, however, are not part of the PSTN, it is unclear what telephone numbers should be assigned to each private line in order to complete incoming calls. The public NANP numbers discussed above are intended only for lines or stations served by the local exchange carrier network and the long distance carriers are not authorized to assign NANP numbers to provide special telecommunication services.

It has been suggested that long distance carriers identify private lines using NANP numbers that have been secured by the long distance carrier from local carriers. However, the scarce public numbering resources makes such reallocation of NANP numbers to private line customers impractical. In addition, such a solution requires each long distance carrier to have a contractual relationship with many local carriers in different regions of the country to serve their business customers. Finally, such a solution requires the entire ten-digit number to be processed in the long distance network, to select a particular private line.

As apparent from the above-described deficiencies with the use of public numbering plans for private lines, a method and apparatus that permit a plurality of numbering plans to be implemented in the same network. A further need exists for a private numbering plan for private line customers.

SUMMARY OF THE INVENTION

Generally, a method and apparatus are disclosed for implementing a plurality of numbering plans in a telecommunications network. A network in accordance with the present invention can support a novel private numbering plan for identifying private lines, as well as conventional public numbering plans, such as the NANP in the United States. In the illustrative embodiment of the invention, the hybrid numbering plan has a generic format of NPA-PPP-EXTN. The NPA value is a geographic component, in a similar manner to the NANP plan. The PPP value identifies private lines or trunks. The EXTN value carries the digits required by the called party, such as the private branch exchange (PBX) switch of a customer, through the network to the terminating private line. For example, the EXTN digits can correspond to the digits required by a customer PBX switch to route calls to stations connected to the PBX or to another PBX. The number of digits in each field of the illustrative hybrid numbering plan is for illustration only.

According to one aspect of the invention, a numbering plan flag differentiates each of the different numbering plans employed by a network, such as the private numbering plan and the public numbering plan, to establish a plurality of routing domains. If the numbering plan flag is set to a predefined value, each private line number can be identified as being part of the hybrid numbering plan. Thus, upon receipt of an incoming call, the entry switch determines whether the call is associated with a private or public numbering plan, and sets the numbering plan flag to an appropriate value, indicating whether a given number is a private plan number or a public number. Thereafter, the numbering plan flag value is carried with the call through the network as the call progresses from one switch to the next. Each node or switch uses the numbering plan flag to access the appropriate routing table and forward the call to the proper destination.

The present invention can be extended to create multiple domains, such as one or more domestic domains (NANP plan), one or more private domains (Private Numbering Plan), and one or more international domains (International Numbering Plan). The numbering plan flag can be configured to differentiate among each possible routing domain, for example, using multiple flags or multiple bits in a single flag.

Upon receipt of an incoming call, the entry switch determines whether the call is associated with a private or public numbering plan, for example, by accessing a local or centralized database. During digit analysis, the entry switch or centralized database maps the dialed digits into a network routing number. If the egress method provisioned in the database is by means of a private line, the switch/database sets the numbering plan flag value identifying the routing number as a private number. The numbering plan flag is forwarded with the call by each switch along the route. If the numbering plan flag indicates that the destination is a private line, the switch uses the "private" routing domain for digit translation. This process is repeated at all switches through which the call traverses. At the exit switch, the private portion of the routing number (NPA-PPP) is deleted and the remaining digits are sent over the private line to the customer location. At the final network node, the terminating switch can employ a delete/prefix function to delete the routing digits (NPA and PPP values), before forwarding the remaining digits (along with the prefix, if any) to the customer location.

Thus, in accordance with the present invention calls can be completed to private lines, without assigning public telephone numbers to the private lines. In addition, since the private numbering plan is under the control of the corresponding long distance carrier, the private numbering plan does not have to conform to any standard. The rules governing the format of the private numbers can be derived to meet the operational needs of the long distance carrier.

A more complete understanding of the present invention, as well as further features and advantages of the present invention, will be obtained by reference to the following detailed description and drawings.

BRIEF DESCRIPTION OF THE DRAWINGS

FIG. 3 illustrates a sample table from the abbreviated dialing translation table of FIG. 2;

FIG. 4 illustrates a sample table from the private number plan table of FIG. 2;

FIG. 5 illustrates a sample table from the entry/intermediate node translation table of FIG. 2;

FIG. 6 illustrates a sample table from the destination node translation table of FIG. 2.

DETAILED DESCRIPTION

Figure 1:
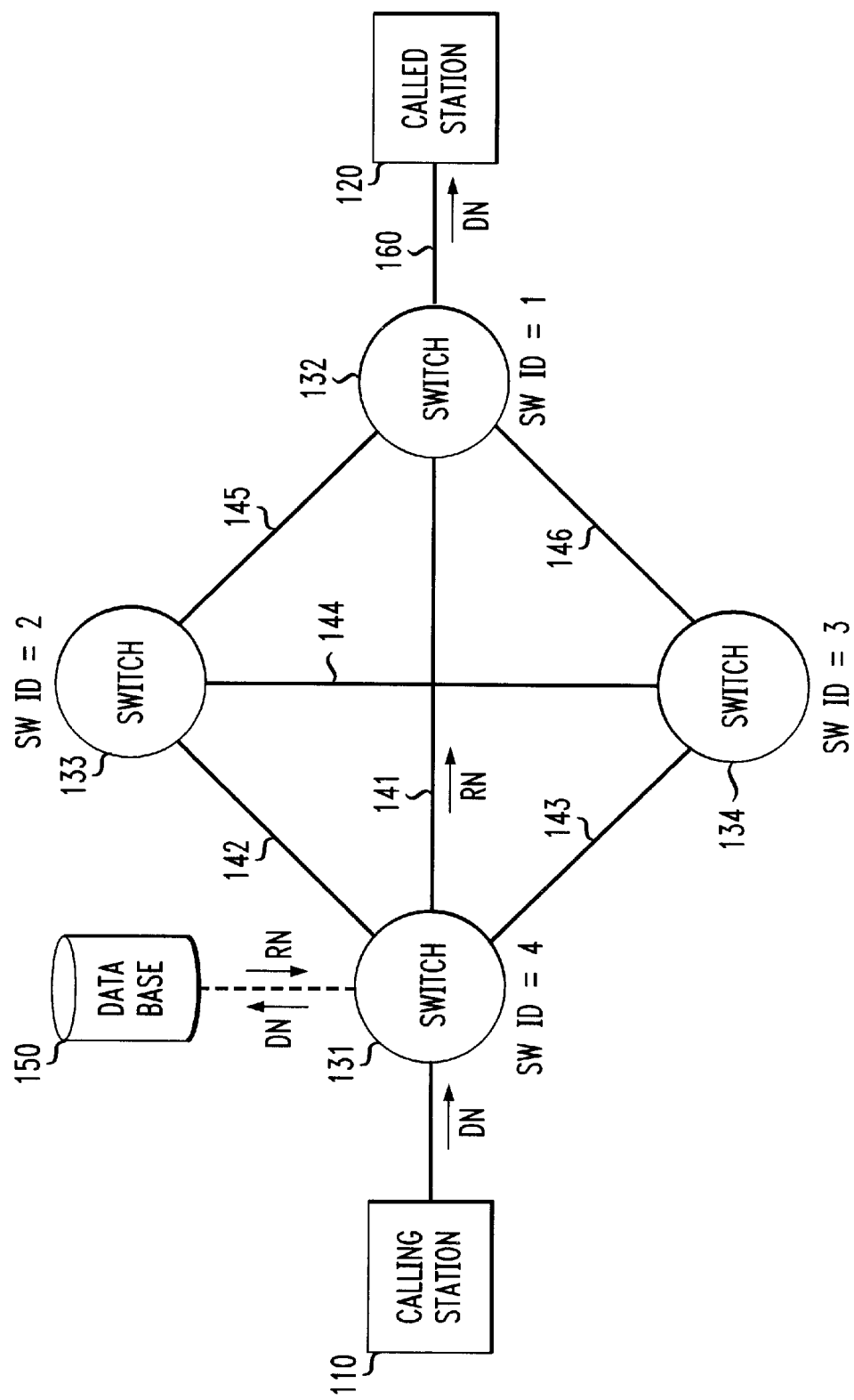
FIG. 1 illustrates a conventional communications network.

The present invention provides a method and apparatus for supporting a plurality of numbering plans in a network, such as the network 100. Thus, in accordance with the present invention, the network 100 can support a novel hybrid numbering plan for identifying private lines, as well as one or more additional conventional public numbering plans, such as the NANP in the United States.

In the illustrative embodiment of the invention, the hybrid numbering plan has a generic format of NPA-PPP-EXTN. The first part of the hybrid numbering plan is an NPA value, which is a geographic component, in a similar manner to the NANP plan. The second part of the hybrid numbering plan format is a PPP value, which identifies private lines (trunks). The final part of the hybrid numbering plan format is an EXTN value, which carries the dialed digits (or translated digits) through the network to the terminating private line. The EXTN digits are needed, for example, at a private branch exchange (PBX) switch associated with the called location 120 to route the call to a station connected to the PBX.

It is noted that the number of digits in each field of the illustrative hybrid numbering plan is for illustration only. For example, a given network, such as the network 100, need not support the same number of NPAs from the PSTN plan under the private plan of the present invention. As the number of private lines grows in the network 100, additional NPA and PPP values could be added. In fact, a long distance carrier can allocate more or less digits to the NPA and PPP values depending upon the size of the network and the number of private lines to be served per switch. The actual number of extension digits, EXTN, to be forwarded over a terminating private line to the customer location is decided by the customer, and is pre-provisioned in the network. For example, the total length of the private number could exceed ten digits, if needed.

The hybrid numbering plan disclosed herein allows calls to the private lines to be completed, without assigning public telephone numbers to the private lines. Furthermore, since the hybrid numbering plan is under the control of the corresponding long distance carrier, the hybrid numbering plan does not have to conform to any standard.

According to a further feature of the present invention, a numbering plan flag or indicator is utilized to differentiate each of the different numbering plans employed by the network 100, such as the hybrid numbering plan of interest, and the public numbering plan. Thus, the numbering plan flags of the present invention can be used to establish a plurality of routing domains. If the numbering plan flag is set to a predefined value, each private line number can be identified as being part of the hybrid numbering plan. Thus, upon receipt of an incoming call, the entry switch determines whether the call is associated with a private or public numbering plan, and sets the numbering plan flag to an appropriate value, indicating whether a given number is a private plan number or a public number. Thereafter, the numbering plan flag value is carried with the call through the network as the call progresses from one switch to the next. Each node or switch 131–134 uses the numbering plan flag to access the appropriate routing table and forward the call to the proper destination. The numbering plan flag can be configured to differentiate among each possible routing domain, for example, using multiple flags or multiple bits in a single flag.

In an illustrative implementation, two separate sets of translation tables are maintained in every switch for routing purposes. Thus, the present invention partitions the network 100 into two domains for routing, with one domain based on the conventional public numbering plan and the second domain based on the private numbering plan. The present invention can be extended to create multiple domains, such as one or more domestic domains (NANP plan), one or more private domains (Private Numbering Plan), and one or more international domains (International Numbering Plan). For example, a private domain can be provided for ISDN-type private lines and another private domain can be provided for non-ISDN type private lines.

Figure 7:
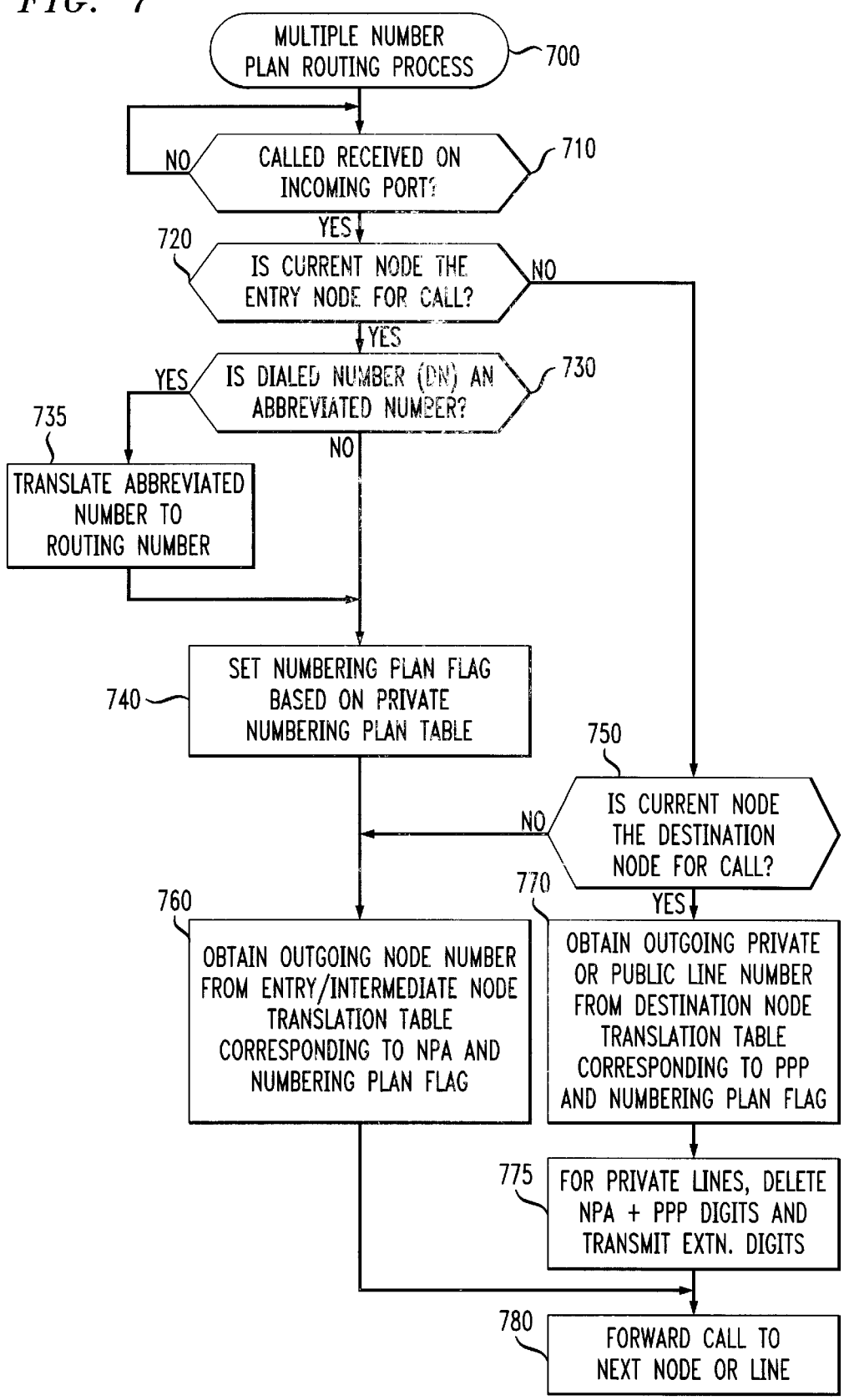
FIG. 7 is a flow chart describing an exemplary multiple numbering plan routing process implemented by the network node of FIG. 2.

As discussed further below in conjunction with FIG. 7, upon receipt of an incoming call, the entry switch determines whether the call is associated with a private or public numbering plan, for example, by accessing a local or centralized database. During digit analysis, the entry switch or centralized database maps the dialed digits into a network routing number. If the egress method is by means of a private line, the switch/database sets the numbering plan flag value identifying the routing number as a private number. The numbering plan flag is forwarded with the call by each switch along the route. If the numbering plan flag indicates that the destination is a private line, the switch uses the "private" domain for digit translation. This process is repeated at all switches through which the call traverses. At the exit switch, the private portion of the routing number (NPA-PPP) is deleted and the remaining digits are sent over the private line to the customer location. At the final network node, the terminating switch can employ a delete/prefix function to delete the routing digits (NPA and PPP values), before forwarding the remaining digits (along with the prefix, if any) to the customer location.

Figure 2:
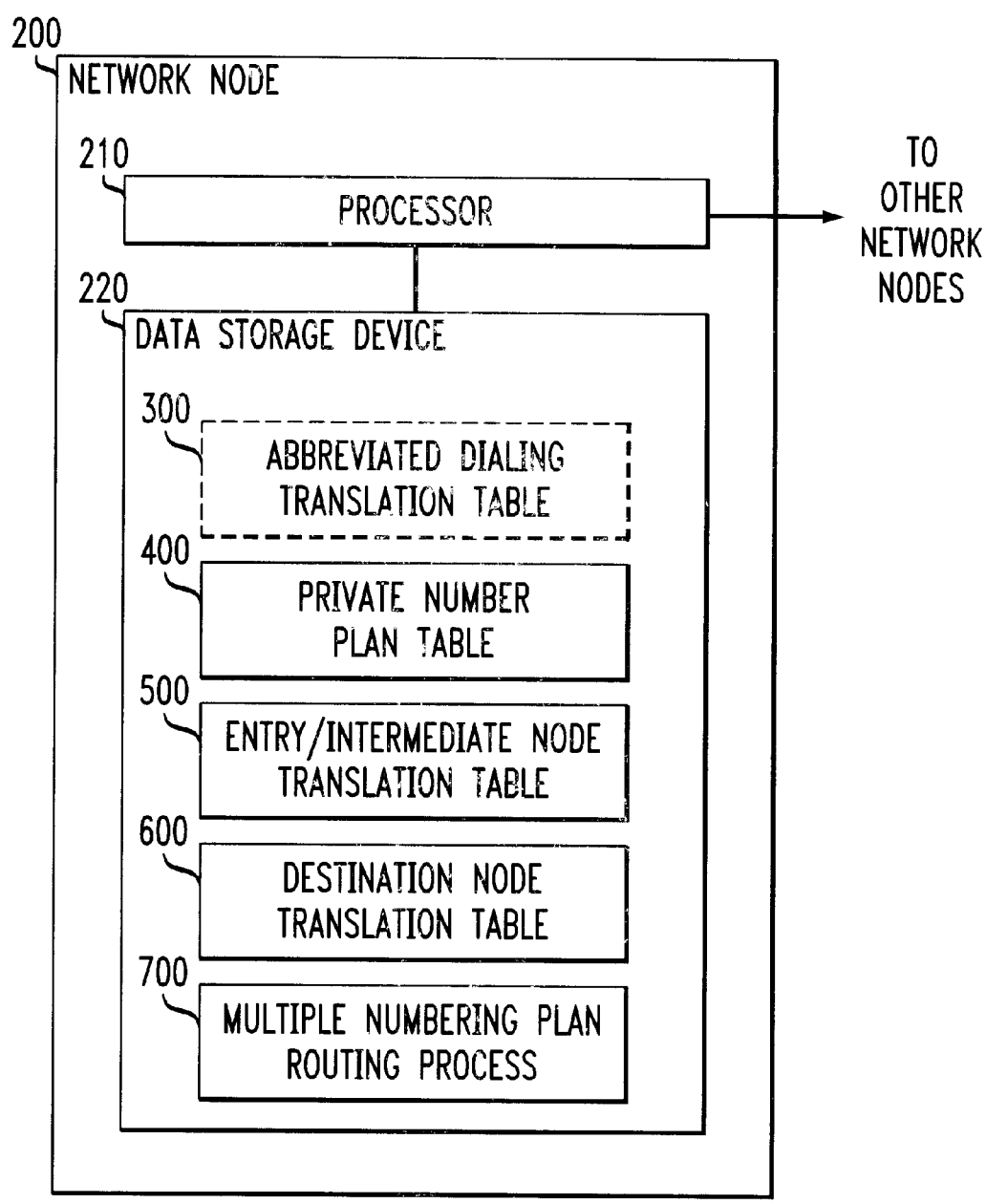
FIG. 2 is a block diagram illustrating an exemplary network node of FIG. 1.

FIG. 2 illustrates an exemplary network node 200 in accordance with the present invention, such as the switches 131–134. The network node 200 may be embodied as a conventional network node, as modified herein to implement the features and functions of the present invention. The network node 200 preferably includes a processor 210 and related memory, such as a data storage device 220. The processor 210 may be embodied as a single processor, or a number of processors operating in parallel. The data storage device 220 and/or a read only memory (ROM) are operable to store one or more instructions, which the processor 210 is operable to retrieve, interpret and execute.

As discussed further below in conjunction with FIGS. 3 through 6, respectively, the data storage device 220 preferably includes an optional abbreviated dialing translation table 300, a private number plan table 400, an entry/intermediate node translation table 500 and a destination node translation table 600. It is noted that while the next leg in the path from an entry node or an intermediate node is another node, while the next leg in the path from a destination node is a public (LEC) network or private line terminating in a customer location.

Generally, the abbreviated dialing translation table 300, if utilized, translates an abbreviated dialed number to a routing number, such as a ten-digit number in the illustrative implementation. The private number plan table 400 is utilized to determine if a given routing number is associated with a private line. The entry/intermediate node translation table 500 is utilized by the network node 200 to route calls for which the network node 200 is an entry or intermediate node. The entry/intermediate node translation table 500 is utilized by the network node 200 to route calls for which the network node 200 is a destination node. As previously indicated, the numbering plan flag is utilized to implement a plurality of routing domains. Thus, the network node 200 must maintain entry/intermediate node translation tables 500 and destination node translation tables 600 for each domain.

In addition, as discussed further below in conjunction with FIG. 7, the data storage device 220 preferably includes a multiple numbering plan routing process 700. The multiple numbering plan routing process 700 is executed by each node 131–134 in the network 100 and processes each incoming call based on whether the node is serving as an entry, intermediate or destination node for a given call. The multiple numbering plan routing process 700 utilizes the received numbering plan flag and routing information to determine where to route the call.

As previously indicated, the network node optionally utilizes a abbreviated dialing translation table 300 to translate an abbreviated dialed number to a routing number, such as a ten-digit number in the illustrative implementation. As shown in FIG. 3, the abbreviated dialing translation table 300 maintains a plurality of records, such as records 305–315, each associated with a different abbreviated dialed number. For each abbreviated dialed number set forth in field 330, the abbreviated dialing translation table 300 indicates the corresponding routing number in field 340. In this manner, the EXTN value can be derived at the entry node from the private dialed number. For example, the abbreviated dialing number 91234 corresponds to a four-digit extension of 1234 and a routing number of NPA+PPP+1234.

The network node utilizes a private number plan table 400 that stores a list of the private numbers, to determine if a given routing number is associated with a private line. As shown in FIG. 4, the private number plan table 400 maintains a plurality of records, such as records 405–415, each associated with a routing number corresponding to a private line. For example, the private number plan table 400 indicates that the routing number NPA+PPP+1234 is a private number.

The network node utilizes an entry/intermediate node translation table 500 to route calls for which the network node 200 is an entry or intermediate node. As shown in FIG. 5, the entry/intermediate node translation table 500 maintains a plurality of records, such as records 505–525, each associated with a different geographic NPA component. For each NPA value set forth in field 530, the entry/intermediate node translation table 500 provides an identifier of the switch associated with the NPA in field 540. For example, the entry/intermediate node translation table 500 indicates that the NPA of "718" is associated with switch one 131.

The network node utilizes a destination node translation table 600 to route calls for which the network node 200 is a destination node. As shown in FIG. 6, the destination node translation table 600 maintains a plurality of records, such as records 605–625, each associated with a different private line identifier, PPP. For each PPP value set forth in field 630, the destination node translation table 600 provides an identifier of the private line associated with the PPP in field 640. For example, the destination node translation table 600 indicates that the PPP of "998" is associated with private line 998. The destination node translation table 600 can also identify any delete/prefix digits and the type of signaling for the private line (not shown). In addition, the destination node translation table 600 can be extended by adding another column for NPA values or a separate destination node translation table 600 for each NPA value.

As previously indicated, each node 131–134 in the network 100, such as network node 200, executes a multiple numbering plan routing process 700 to process each incoming call based on whether the node is serving as an entry, intermediate or destination node for a given call. The multiple numbering plan routing process 700 utilizes the received numbering plan flag and routing information to determine where to route the call. Thus, for a call that traverses, for example, three network nodes between the source and the destination, the multiple numbering plan routing process 700 will be independently executed by each of the three nodes. As shown in FIG. 7, the multiple numbering plan routing process 700 initially waits during step 710 until a call is received at an incoming port of the network node 200. Once a call is received, a test is performed during step 720 to determine if the node is the entry node for the call. If it is determined during step 720 that the node is the entry node for the call, then a further test is performed during step 730 to determine if the dialed number (DN) is an abbreviated number (private dialing plan). If it is determined during step 730 that the dialed number is an abbreviated number, then the abbreviated number is translated during step 735 to the routing number (RN).

The private number plan table 400 is accessed during step 740 to determine if the routing number (RN) is a private number and the appropriate value of the numbering plan flag is set. Program control then proceeds to step 760.

If, however, it was determined during step 720 that the node is not the entry node for the call, then a further test is performed during step 750 to determine if the node is the destination node for the call. If it is determined during step 750 that the node is not the destination node for the call, then program control then proceeds to step 760.

The appropriate outgoing node number is obtained from the entry/intermediate node translation table 500 during step 760 based on the NPA value and the value of the numbering plan flag. Program control then proceeds to step 780.

If it was determined during step 750 that the node is the destination node for the call, then the appropriate outgoing public or private line number is obtained from the destination node translation table 600 during step 770 based on the PPP value and the value of the numbering plan flag. Thereafter, for private lines, the NPA and PPP values are deleted from the routing number (RN) by the destination node during step 775, and the remaining extension, EXTN, digits are provided to the customer. The call is then forwarded to the next node or line, as appropriate for entry/intermediate nodes and destination nodes, respectively.

EXAMPLE

The calling station 110 shown in FIG. 1 dials a five-digit extension, such as 91234, to reach the called station 120 in a distant location. The called station 120 is connected to the network 100 via a private line. In order to provide this service, the network 100 must complete this call to the private line egress and forward the dialed digits (or translated digits) to the customer's PBX.

The dialed number from the calling station 110 is received by the switch 131. Switch 131 recognizes the call to be an abbreviated dialing call. The switch 131 utilizes a local or centralized database, such as the abbreviated dialing translation table 300, to map the dialed number into a network Routing Number. Thereafter, a further local or centralized private number plan table 400 is accessed to determine if the routing number is part of the public or private numbering plan. In this example, the translated RN, NPA+PPP+1234, corresponds to the private numbering plan and the numbering plan flag is set to the appropriate value.

Based on the NPA value and the numbering plan flag, the entry switch 131 maps the NPA digits of the RN into a destination (exit) Switch Id. In this example, the Switch Id is "1" which corresponds to Switch 132. Switch 131 then routes the call to Switch 132, either via a direct route (Trunk 141) or via an intermediate switch (e.g., via Switch 133 or 134). The intermediate switch 133, 134 does not have to translate digits if it receives the Switch Id in the signaling. Otherwise, the intermediate switch 133, 134 can map the NPA digits to derive the destination switch identifier, as would be apparent to a person of ordinary skill in the art. The exact routing scheme is not part of this invention and is not described herein. For the case when a direct route is selected, Switch 131 forwards the RN and the numbering plan flag to Switch 132.

Based on the numbering plan flag and the PPP value, switch 132 translates the 'PPP' digits to determine the specific private line for which the call is destined. In the final stage of call processing, Switch 132 invokes a delete/prefix operation that deletes the NPA-PPP digits of the RN. The switch 132 forwards the remaining digits (4-digit extension, in this case) over the private line to the called station. The call completes to the called station 120.

The hybrid numbering plan, described above, can support a variety of customers' private dialing plans, not just the 5-digit extension dialing plan. For example, a 7-digit dialing plan commonly employed in private networks can be readily supported. The only limitation on the length of the dialed digits is that it should not exceed 9 digit, in order for the Routing Number (which could include the dialed number) not to exceed 15-digit. The 15 digit numbers are supported by most switches, and is becoming an industry standard.

It is to be understood that the embodiments and variations shown and described herein are merely illustrative of the principles of this invention and that various modifications may be implemented by those skilled in the art without departing from the scope and spirit of the invention.

I claim:

1. A method for routing a call through a network along a path from an entry node to a destination node, said network comprised of a plurality of nodes, said method comprising the steps of:

receiving a routing number identifying a destination for said call;

assigning a numbering plan flag to said call indicating whether said routing number is associated with a public line or a private line; and utilizing said numbering plan flag and said routing number at each node along said path to forward the call to said destination node.

2. The method according to claim 1, wherein said numbering plan flag is utilized to access an appropriate routing table.

3. The method according to claim 1, wherein said routing number corresponding to a private line has the form NPA-PPP-EXTN, where the NPA value indicates the geographic area of said destination, the PPP value identifies said private line and the EXTN value comprises digits that are to be delivered to a called party.

4. The method according to claim 3, wherein said EXTN digits is derived at the entry node from the private dialed number.

5. The method of claim 3, wherein said EXTN value delivers private dialing plan numbers or a translated version of said private dialing plan numbers across said network to a destination.

6. The method of claim 5, wherein said delivered private dialing plan numbers can be utilized to route calls to lines connected to a private branch exchange (PBX) switch associated with said private line.

7. The method of claim 3, further comprising the step of canceling said NPA and PPP values before providing said call to said private line.

8. A method for establishing a plurality of routing domains in a network, said method comprising the steps of:

assigning a numbering plan flag to calls in said network, said numbering plan flag identifying a routing domain associated with said call; and utilizing said numbering plan flag at each node along a path to forward the call to a destination node.

9. The method according to claim 8, wherein said numbering plan flag indicates whether said call is associated with a public or a private line.

10. The method according to claim 8, wherein at least one of said routing domains is provided for routing calls to public lines.

11. The method according to claim 8, wherein at least one of said routing domains is provided for routing calls to private lines.

12. The method according to claim 8, wherein said numbering plan flag is utilized to access an appropriate routing table for said routing domain at each node in said network.

13. A method for routing a call through a network along a path from an entry node to a destination node, said network comprised of a plurality of nodes, said method comprising the steps of:

receiving a routing number identifying a destination for said call;

assigning a numbering plan flag to said call identifying a numbering plan associated with said call;

utilizing said numbering plan flag and said routing number at each node along said path to forward the call to said destination node.

14. The method according to claim 13, wherein said numbering plan flag is utilized to access an appropriate routing table.

15. The method according to claim 13, wherein said numbering plan flag indicates whether said call is associated with a public or a private line.

16. The method according to claim 13, wherein said routing number corresponding to a private line has the form NPA-PPP-EXTN, where the NPA value indicates the geographic area of said destination, the PPP value identifies said private line and the EXTN value comprises digits that are to be delivered to a called party.

17. The method according to claim 16, wherein said EXTN digits is derived at the entry node from the private dialed number.

18. The method according to claim 16, wherein said EXTN value delivers private dialing plan numbers or a translated version of said private dialing plan numbers across said network to a destination.

19. The method of claim 18, wherein said delivered private dialing plan numbers can be utilized to route calls to lines connected to a private branch exchange (PBX) switch associated with said private line.

20. A network node for routing a call through a network along a path from an entry node to a destination node, said network node comprising:
   a memory for storing routing information for a plurality of routing domains, each of said routing domains identified by a numbering plan flag;
   a communications port for receiving said call with a routing number identifying a destination for said call and a numbering plan flag identifying one of said routing domains; and
   a processor for (i) accessing the appropriate routing information based on said numbering plan flag and at least a portion of said routing number, and (ii) forwarding the call to said destination node in accordance with said routing information.

21. The network node of claim 20, wherein said routing number corresponding to a private line has the form NPA-PPP-EXTN, where the NPA value indicates the geographic area of said destination, the PPP value identifies said private line and the EXTN value comprises digits that are to be delivered to a called party.

22. The network node according to claim 21, wherein said EXTN digits is derived at the entry node from the private dialed number.

23. The network node of claim 21, wherein said EXTN value delivers private dialing plan numbers or a translated version of said private dialing plan numbers across said network to a destination.

24. The network node of claim 23, wherein said delivered private dialing plan numbers can be utilized to route calls to lines connected to a private branch exchange (PBX) switch associated with said private line.

25. The network node of claim 21, wherein said processor is further configured to cancel said NPA and PPP values before providing said call to said private line, if said node is a destination node for said call.

26. The network node of claim 20, wherein said numbering plan flag indicates whether said call is associated with a public or a private line.

27. The network node according to claim 20, wherein at least one of said routing domains is provided for routing calls to public lines.

28. The network node according to claim 20, wherein at least one of said routing domains is provided for routing calls to private lines.

29. The network node according to claim 20, wherein said numbering plan flag is utilized to access an appropriate routing table for said routing domain at each node in said network.

* * * * *